Patented Dec. 26, 1939

2,185,141

UNITED STATES PATENT OFFICE 2,185,141

PREPARATION OF BETA-PHENYLETHYL ALCOHOL

Joseph W. Britton, Gerald H. Coleman, and Bartholdt C. Hadler, Midland, Mich., assignors to The Dow Chemical Company, Midland, Mich., a corporation of Michigan No Drawing. Application December 6, 1937, Serial No. 178,400

7 Claims. (Cl. 260—618)

This invention concerns a method for the preparation of beta-phenylethyl alcohol from beta-halo-ethylbenzenes or from mixtures of the same with nuclear halogenated ethylbenzenes.

We have found that beta-halo-ethylbenzenes may be hydrolyzed to produce beta-phenylethyl alcohol, but that such hydrolysis occurs satisfactorily only when carried out at moderately high temperatures using an aqueous solution or suspension of a weak alkali as the hydrolytic agent. When a strong alkali, e. g. sodium or potassium hydroxide, is employed as the hydrolyzing agent, the product consists principally of styrene, resinous materials, etc.

According to the invention, the beta-halo-ethylbenzene, e. g. beta-chlor-ethylbenzene or beta-brom-ethylbenzene, is heated with an aqueous solution or suspension of a weak alkaline agent at a temperature of approximately 125°–250° C. and under super-atmospheric pressure. As the weak alkaline agent, sodium carbonate or calcium hydroxide is ordinarily employed, although other weak alkalies, such as borax, calcium carbonate, ferrous hydroxide, tri-sodium phosphate, sodium acetate, etc., may be used. In general, we have found that the metal salts and hydroxides which when dissolved in or mixed with water to the extent of one chemical equivalent per kilogram of water give solutions or suspensions which have a pH value of approximately 7.5–11.5, are suitable hydrolytic agents.

The proportions of beta-halo-ethylbenzene, alkaline agent, and water may be varied widely, but the yield of beta-phenylethyl alcohol is usually highest when approximately 1–2 chemical equivalents of alkaline agent are employed per mole of beta-halo-ethylbenzene. Between 25 and 50 moles of water are usually employed per mole of beta-halo-ethylbenzene but the water may be employed in smaller or larger proportions if desired.

The reaction is usually carried out by charging the desired quantities of reactants into a closed vessel or autoclave and heating with agitation to the reaction temperature. Usually the reaction is complete in 5–8 hours, although the time of reaction varies with the particular reactants employed, proportions of reactants, temperature, etc. When the reaction is complete, the reaction vessel is cooled and the contents removed and steam distilled. Beta-phenylethyl alcohol is recovered from the non-aqueous layer of the steam distillate by fractional distillation.

The following examples will illustrate various ways in which the invention has been carried out:—

Example 1

A mixture of 28.1 grams (0.2 mole) of beta-phenylethyl chloride, 10.6 grams (0.1 mole) of sodium carbonate, and 100 grams (5.55 moles) of water were charged into a stainless steel bomb which was then heated at a temperature of 175° C. for 5 hours. When the reaction was complete, the bomb was cooled, opened, and the contents removed and steam distilled. The residual aqueous liquor was analyzed for inorganic chlorides whereby it was found that 95 per cent of the beta-phenylethyl chloride employed had been reacted. The steam distillate separated into two layers, the upper of which contained crude beta-phenylethyl alcohol. The lower aqueous layer was extracted twice with carbon tetrachloride and the extract added to the crude alcohol product. Beta-phenylethyl alcohol was recovered from the crude product by fractional distillation. The yield was 82 per cent of the theoretical based on the beta-phenylethyl chloride reacted.

Example 2

A mixture of 28.1 grams (0.2 mole) of beta-phenylethyl chloride, 7.4 grams (0.1 mole) of calcium hydroxide, and 100 grams (5.55 moles) of water was charged into a stainless steel bomb and the latter was heated at a temperature of 175° C. for 5 hours. 91 per cent of the beta-phenylethyl chloride employed was reacted during said treatment. When the reaction was complete, the bomb was cooled, opened, and the contents steam distilled. Beta-phenylethyl alcohol was recovered from the steam distillate as in Example 1. The yield was 67.5 per cent of the theoretical based on the beta-phenylethyl chloride reacted.

Example 3

A mixture of 281.0 grams (2.0 moles) of beta-phenylethyl chloride, 222.5 grams (2.1 moles) of sodium carbonate, and 850 grams (47.2 moles) of water was heated at 225° C. in a bomb with agitation for 5 hours whereby 86.8 per cent of the beta-phenylethyl chloride was reacted. When the reaction was complete, the beta-phenylethyl alcohol product was separated as in Example 1. The yield was 61.5 per cent of the theoretical based on the reacted beta-phenylethyl chloride.

The invention is not limited to the use of a pure beta-halo-ethylbenzene as the starting material. We have found that nuclear halogenated ethylbenzenes are not hydrolyzed under the conditions employed in the invention and that beta-phenylethyl alcohol may be prepared according to the invention, starting with a mixture of beta-halo-ethylbenzene and nuclear halogenated ethyl-benzene. For instance, ethylbenzene may be halogenated to obtain a mixture of alpha- and beta-halo-ethylbenzenes containing a small proportion of nuclear halogenated ethylbenzenes. The alpha-halo-ethylbenzene may selectively be hydrolyzed under relatively mild conditions, such as by heating the mixture under reflux with water or a dilute aqueous alkali and the hydrolysis products, e. g. alpha-phenylethyl alcohol, separated to leave a residual mixture of beta-phenylethyl halide and nuclear halogenated ethylbenzene. This residual mixture may be treated in accordance with the present invention to produce pure beta-phenylethyl alcohol leaving the nuclear halogenated ethylbenzene unreacted. The latter constitutes a valuable by-product from such series of operations.

Other modes of applying the principle of our invention may be employed, instead of those explained, change being made as regards the method herein disclosed, provided the step or steps stated by any of the following claims or the equivalent of such stated step or steps be employed.

We therefore particularly point out and distinctly claim as our invention:

1. The method of preparing beta-phenylethyl alcohol which comprises hydrolyzing a beta-halo-ethylbenzene with an aqueous inorganic alkaline agent, said alkaline agent being one which when mixed with water to the extent of one chemical equivalent per kilogram of water raises the pH value from that of water alone to a value between about 7.5 and about 11.5.

2. The method of preparing beta-phenylethyl alcohol which comprises heating, at a temperature between about 125° C. and about 250° C. and under super-atmospheric pressure, a mixture of a beta-halo-ethylbenzene, water, and an inorganic alkaline agent which when mixed with water to the extent of one chemical equivalent per kilogram of water raises the pH value from that of water alone to a value between about 7.5 and about 11.5.

3. The method of preparing beta-phenylethyl alcohol which comprises heating, at a temperature between about 125° C. and about 250° C., and under super-atmospheric pressure, a mixture of beta-chlor-ethylbenzene, water, and an inorganic alkaline agent which when mixed with water to the extent of one chemical equivalent per kilogram of water raises the pH value from that of water alone to a value between about 7.5 and about 11.5.

4. The method of preparing beta-phenylethyl alcohol which comprises heating in liquid phase, at a temperature of between about 125° C. and about 250° C., and under a pressure corresponding approximately to the vapor pressure of the reactants at the temperature employed, a mixture of beta-chlor-ethylbenzene, between about 25 and about 50 molecular equivalents of water, and between about 1 and about 2 chemical equivalents of an inorganic alkaline agent which when mixed with water to the extent of one chemical equivalent per kilogram of water raises the pH value from that of water alone to a value between about 7.5 and about 11.5.

5. The method of preparing beta-phenylethyl alcohol which comprises heating beta-chlor-ethylbenzene with between about 1 and about 2 chemical equivalents of sodium carbonate and between about 25 and about 50 molecular equivalents of water at a temperature of between about 125° C. and about 250° C. and under a pressure corresponding approximately to the vapor pressure of the mixture at the temperature employed.

6. The method of preparing beta-phenylethyl alcohol which comprises heating beta-chlor-ethylbenzene with between about 1 and 2 chemical equivalents of calcium hydroxide and between about 25 and about 50 molecular equivalents of water at a temperature of between about 125° C. and about 250° C. and under a pressure corresponding approximately to the vapor pressure of the mixture at the temperature employed.

7. The method of preparing beta-phenylethyl alcohol which comprises heating, at a temperature of between about 125° C. and about 250° C. and under super-atmospheric pressure, a mixture of a beta-halo-ethylbenzene, nuclear halogenated ethylbenzene, water, and an inorganic alkaline agent which when mixed with water to the extent of one chemical equivalent per kilogram of water raises the pH value from that of water alone to a value between about 7.5 and about 11.5, and thereafter separating beta-phenylethyl alcohol and the nuclear halogenated ethylbenzene from the mixture.

JOSEPH W. BRITTON.
GERALD H. COLEMAN.
BARTHOLDT C. HADLER.